United States Patent [19]

Kloosterboer et al.

[11] Patent Number: 4,756,972
[45] Date of Patent: Jul. 12, 1988

[54] LAMINATED OPTICAL COMPONENT

[75] Inventors: Johan G. Kloosterboer; Robert G. Gossink; Gerardus M. M. Van de Hei; Johannes M. G. Verhoeven, all of Eindhoven, Netherlands

[73] Assignee: U. S. Philips Corp., New York, N.Y.

[21] Appl. No.: 618,799

[22] Filed: Jun. 8, 1984

[30] Foreign Application Priority Data

Mar. 19, 1984 [NL] Netherlands .......... 8400868

[51] Int. Cl.$^4$ .................................. G02B 1/10
[52] U.S. Cl. .................... 428/417; 523/168; 264/1.7
[58] Field of Search ........ 525/168; 427/54.1; 428/417

[56] References Cited

U.S. PATENT DOCUMENTS

| 4,134,651 | 1/1979 | England | 350/417 |
| 4,275,091 | 6/1981 | Lippits | 427/54.1 |
| 4,306,780 | 12/1981 | Tarumi | 526/311 |
| 4,489,408 | 12/1984 | Yerhoeven | 369/112 |

Primary Examiner—C. Warren Ivy
Attorney, Agent, or Firm—Norman N. Spain

[57] ABSTRACT

Laminated optical component, for example an aspherical lens, comprising a supporting member which is manufactured from a transparent inorganic material and on at least one side has a layer of lacquer of a specific composition cured by means of radiation, for example UV radiation.

3 Claims, 1 Drawing Sheet

LAMINATED OPTICAL COMPONENT

BACKGROUND OF THE INVENTION

The invention relates to a laminated optical component which comprises a supporting member manufactured from a transparent inorganic material and having on at least one side a layer of a radiation-cured lacquer the free surface of which has a defined shape.

Such a component is known from published Netherlands Patent Application No. 81.04.588 in the name of Applicants.

It is the object of the invention to provide a high-grade optical component of great precision the quality of which is maintained at a high level in the course of years and which can be manufactured in a rapid and cheap manner.

Applicants have found that the quality of a laminated optical component depends considerably on the properties of the lacquer used both in the cured and in the non-cured condition. Furthermore, the properties of the lacquer must be accurately matched to those of the material from which the supporting member is manufactured.

According to the recognition underlying the present invention the lacquer must satisfy a package of requirements. For example, in the cured condition the lacquer must readily adhere to the supporting member. A suitable adhesive which copolymerises with the lacquer is notably γ-methacryloyloxypropyltrimethoxysilane. The adhesive bond must be capable of withstanding both temperature fluctuations and moisture for a long period of time. The cured lacquer layer may not be attacked by components in the atmosphere or by components such as Na+ and K+ ions which may diffuse to the lacquer layer from the supporting member, for example a glass supporting member. The cured lacquer layer must exhibit no or no noteworthy internal stresses and must have a comparatively high refractive index of $n_D = 1.56$ or higher.

During curing the shrinkage must be small, at most in the order of magnitude of a few percent by volume. Furthermore a good resistance to deformation, hardness and scratch resistance are of importance. In the uncured condition the lacquer must have a viscosity of preferably 2-4 Pa.s at 20° C. and it must cure rapidly. The curing time is at most one minute and is preferably at most 10 to 20 seconds, with an illumination intensity of 2-20 mJ/cm² (λ=300-400 nm).

The invention provides a laminated optical component of the type mentioned in the opening paragraph which has a permanent high-grade quality and in which notably the lacquer used satisfies the above-mentioned package of requirements.

SUMMARY OF THE INVENTION

According to the invention this is achieved by means of a laminated optical component which is characterized in that the lacquer comprises at least 50% by weight of a compound which satisfies the formula

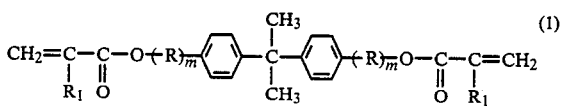

wherein $R_1$ is a hydrogen atom or a methyl group,

R is a group which satisfies the formula

wherein
$R_2$ is an alkylene group having 2-8 carbon atoms which may be substituted with one or more hydroxyl groups
$R_3$ and $R_4$ are equal or different and each represent an alkylene group having 1-4 carbon atoms, and
m=0 or 1.

The high-grade optical component according to the invention is manufactured by using a replica process known per se. This process provides a rapid and cheap method for series production of the optical component. In the replica process a mould (matrix) is used having an accurately defined surface, for example, an aspherical surface. A small quantity of the radiation-curable lacquer, for example UV-curable lacquer, is provided on the surface on the mould. The supporting member is pressed against the mould or conversely, the lacquer spreading between the supporting member and the mould. It is also possible for the surface of the supporting member facing the mould to be provided with a small quantity of lacquer instead of the mould. In the latter case also, upon pressing the supporting member and the mould, respectively, against the surface of the mould and the supporting member, respectively, the lacquer is spread between the supporting member and the mould. The lacquer is then cured by radiation and finally the supporting member and the cured lacquer layer connected thereto is removed from the surface of the mould or matrix. The free surface of the lacquer layer is the negative of that of the mould.

The lacquer used in the component according to the invention presents the advantage that after detaching the component from the mould the free surface of the lacquer layer has a permanent, perfect, optical quality. This means that the surface has a supersmooth texture having a surface roughness $R_T$ of at most 0.02 μm.

The supporting member is preferably manufactured from a transparent inorganic oxide or chalcogenide. Examples hereof are glass, quartz glass, zirconium oxide and arsenic trisulphide.

The surface of the supporting member adjoining the lacquer layer preferably has a shape which can be realised simply by a grinding or polishing process. Furthermore the shape is such that the differences in thickness of the lacquer layer are as small as possible. As an example may be mentioned an aspherical optical component the free surface of the lacquer layer of which is of course aspherical. The surface of the supporting member is, for example, spherical having such a radius of curvature that the differences in thickness of the lacquer layer, measured over the surface of the lacquer layer are as small as possible. A supporting member having a spherical surface is much simpler and easier to manufacture than a supporting member having an aspherical surface. The latter would be necessary according to the above example if no lacquer layer were present.

A supporting plate and a cured lacquer layer the refractive indices of which are equal or substantially equal are preferably used in the optical component according to the invention. Under these conditions the surface of the supporting member or the supporting plate adjoining the lacquer layer need not be accurately defined.

This means, for example, that said surface according to the above example need not be exactly spherical. A refined grinding and polishing method then is no longer necessary, which is cost-saving.

The compound according to formula (1) given above is a known substance. The substance is manufactured by alkoxylating bisphenol-A to a compound of the formula

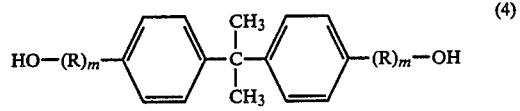

(4)

wherein R and m have the above meanings, and converting this then into their (meth)acrylic acid diesters by reaction with (meth)acrylic acid, (meth)acryloyl chloride or by re-establishing by means of the corresponding methyl ester.

Examples of suitable compounds are given by the formulae below merizes with these components, for example a monoacrylate, monomethacrylate or N-vinyl-pyrrolidone.

In a further preferred form of the invention the lacquer comprises a mixture of a compound of formula (1) and an aromatic monoacrylate. An example of a suitable aromatic monoacrylate is phenoxyethylacrylate which satisfies the formula

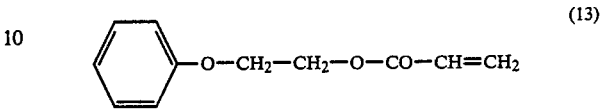

(13)

An aromatic monoacrylate, as compared with, for example, aliphatic mono-acrylates, presents the advantage of a comparatively high refractive index after curing.

The quantity of the diluent may vary between 4 and 45% by weight.

In addition to the compound of formula (1) and, optionally, a diluent, the lacquer comprises the usual additives, for example a photosensitive initiator in a quantity by weight of 0.1–8%. A suitable initiator is a ketal, for

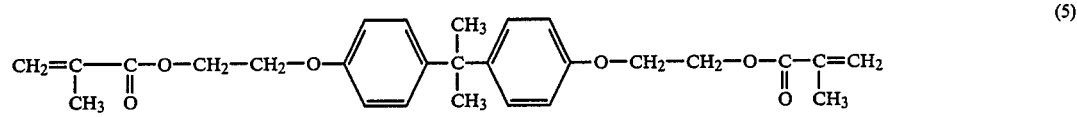

(5)

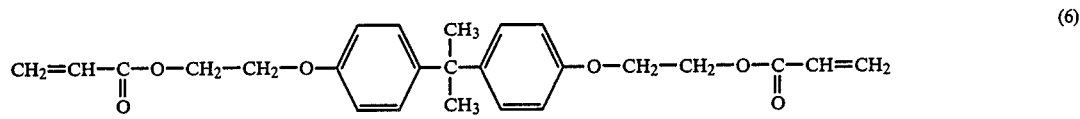

(6)

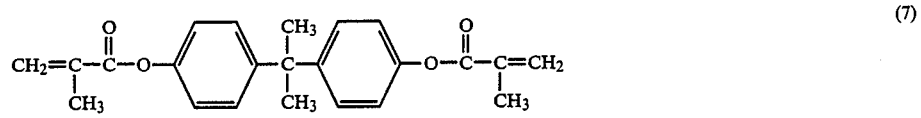

(7)

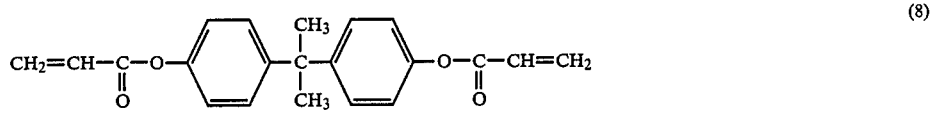

(8)

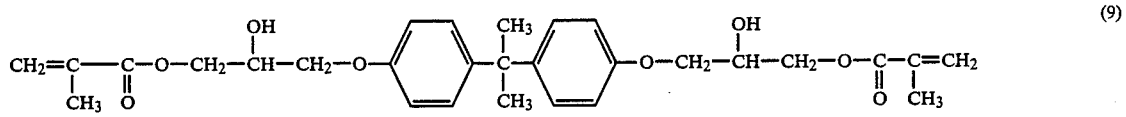

(9)

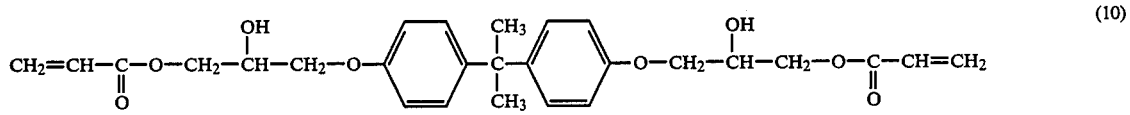

(10)

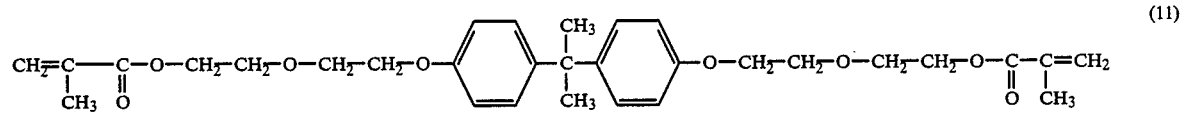

(11)

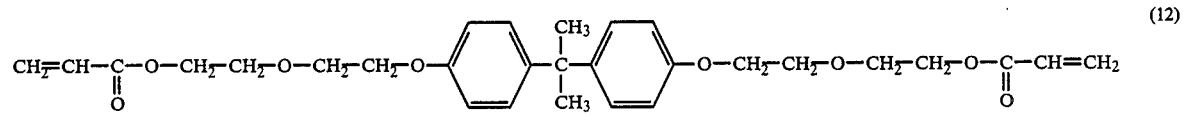

(12)

The compound according to formula (5) is preferably used. The compounds according to formulae (7)–(10) are solid or very viscous substances which are diluted with or dissolved in a reactive diluent which copolymerizes example benzildimethyl ketal or an aromatic carbonyl compound, for example benzoin-isobutyl ether. The lacquer may also be provided with a stabiliser, for example, the mono-methylether or hydroquinone in a quantity by weight from 0.01 to 0.05% or of an accelerator, for example methyldiethanolamine in a quantity of 0.3% by weight.

The high refractive index of the lacquer used in the optical component according to the invention is of importance to achieve a high optical quality. For a lens having an aspherical surface it holds furthermore that the asphericity is lower with a higher refractive index. As a result of this the differences in layer thickness of the lacquer becomes less, which facilitates the manufacture of the optical component. The manufacture of the matrix also becomes simpler.

The laminated optical component according to the invention may be, for example, an aspherical lens, for example a collimator or an objective lens, an optical grid, a beam splitter, a prism or a mirror.

It is to be noted that it is known per se, for example from published Japanese patent Applications JP No. 162443 (1980) and JP No. 002937 (1981) to manufacture simple lenses which are destined in particular as spectacle glasses, entirely from plastics. UV-light curable or thermally curable compositions are used which comprise copolymers or mixtures of monomers. Some constituents of said lacquers are based on acrylates or methacrylates derived from bisphenol-A. In these publications the problems underlying the present invention, for example, the mutual influencing and matching between a supporting member of an inorganic material and an extremely thin cured layer of lacquer in high-grade optical components, do not play any role at all. The method of manufacturing lenses according to the above-mentioned publications in which an injection moulding process is used also differs entirely from the replica process with which the laminated optical components according to the present application are manufactured.

DETAILED DESCRIPTION OF THE INVENTION

Figure 1:
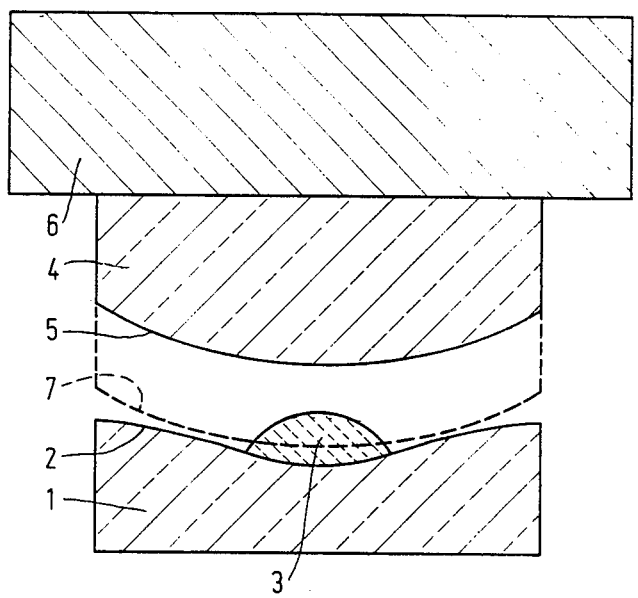
FIG. 1 is a cross-sectional view of a device for manufacturing an optical component of the invention.
Figure 2:
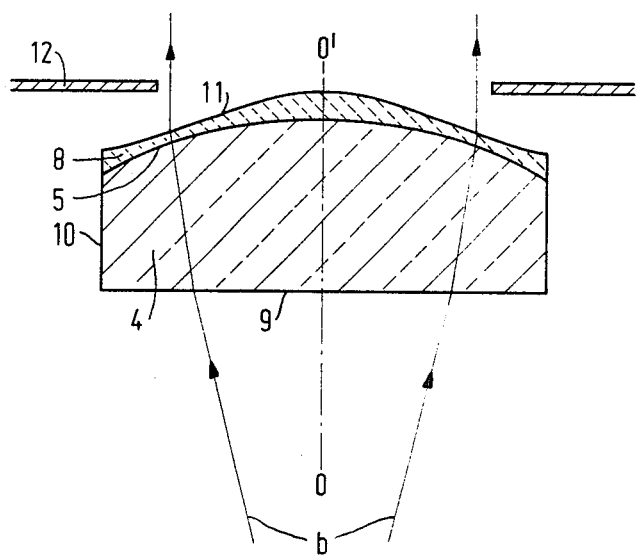
FIG. 2 is a cross-sectional view of an optical component of the invention.

The invention will be described in greater detail by means of the embodiment and the drawing, in which FIG. 1 is a cross-sectional view of a device for manufacturing a laminated aspherical lens, and FIG. 2 is a cross-sectional view of the aspherical lens manufactured by means of the device shown in FIG. 1.

EXAMPLE

Manufacture of a collimator lens.

Reference numeral in FIG. 1 denotes a mould which is manufactured from quartz glass and has an aspherical surface 2. A detecting agent not shown is provided on surface 2 and a drop 3 of an UV-light curable lacquer of the following composition is then provided: 96% by weight of a compound of formula (5), obtainable under the tradename Diacryl 101, 4% by weight of initiator (benzildimethyl ketal).

The viscosity of the lacquer is 3 Pa.s at 20° C. A glass supporting member 4 is provided with an adhesive not shown, for example α-methacryloyloxypropyl-trimethoxysilane. The supporting member has a spherical surface 5. The member 4 is moved in the direction of the aspherical surface 2 by mould 1 by means of pressure plate 6 until a final position is reached indicated by a broken line 7. The distance between spherical surface 5 and aspherical surface 2 then is from 10 μm (smallest distance) to 11 μm (largest distance). During the movement of glass supporting member 4 drop 3 is spread over the aspherical surface 2. In the final position of supporting member 4 the whole space between supporting member and mould 1 is filled by the lacquer of drop 2. The lacquer layer is exposed to UV light via mould 1 for 1 minute with an overall quantity of light energy of 100 mJ/cm² at a wavelength of 300–400 nm. During curing a small shrinkage of the lacquer occurs in the order of magnitude of a few percent by volume. After curing of the lacquer, the supporting member and the cured lacquer layer 8 connected thereto (FIG. 2) is removed from the mould 1. The resulting collimator lens is shown in FIG. 2. In FIG. 2 the same reference numerals are used as in FIG. 1 for corresponding components. The laminated lens shown in FIG. 2 has a plano surface 9, a cylindrical surface 10 and an aspherical surface 11 which is the negative of the aspherical surface 2 of mould 1. The collimator lens shown in FIG. 2 has an excellent optical quality and forms the diverging light beam b into a collimated beam. Of the beam b only the edge rays are shown in the figure, that is to say the rays which just pass the edge of pupil 12.

The rays incident on the flat surface 9 of the lens are refracted towards the optical axis O—O', then traverse the laminated lens member 4, 8 and are further refracted by the aspherical surface 11 towards the optical axis to form a parallel beam. The lacquer layer 8 has an excellent hardness and resistance to scratches and is temperature- and climate-resistant.

What is claimed is:

1. A laminated optical component comprising a transparent supporting member formed of an inorganic material to at least one surface of which supporting member there is adhesively bonded by copolymerization with a monomer adhering to said supporting member a thin layer of a radiation cured lacquer the free surface of which layer is shaped by a mould, said lacquer comprising at least 50% by weight of a compound of the formula

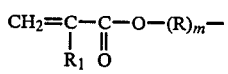

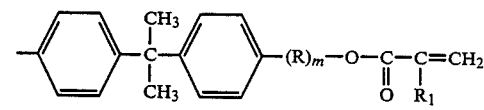

wherein $R_1$ is hydrogen or methyl, R is a moiety of the formula

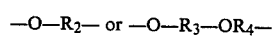

wherein $R_2$ is alkylene of 2–8 carbon atoms or hydroxyl substitution products thereof, $R_3$ and $R_4$ are each independently alkylenes of 1–4 carbon atoms and m=0 or 1.

2. A laminated optical component as claimed in claim 1, characterized in that the compound satisfies the formula

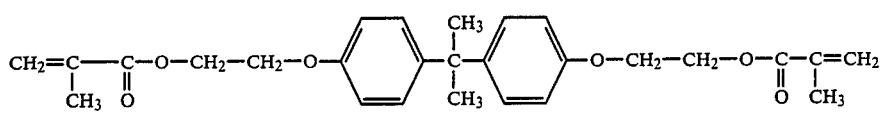 (4)
3. A laminated optical component as claimed in claim 1, characterized in that the lacquer comprises a mixture of a compound of formula 1 and an aromatic monoacrylate.
* * * * *